(12) United States Patent
Päkkilä

(10) Patent No.: US 6,662,982 B1
(45) Date of Patent: Dec. 16, 2003

(54) DEVICE AT A ROOF-MOUNTED LOAD CARRIER FOR VEHICLES

(75) Inventor: Sari Päkkilä, Borås (SE)

(73) Assignee: Mont Blanc Industri AB (SE)

( * ) Notice: Subject to any disclaimer, the term of this patent is extended or adjusted under 35 U.S.C. 154(b) by 0 days.

(21) Appl. No.: 10/342,986

(22) Filed: Jan. 15, 2003

(30) Foreign Application Priority Data

Jun. 26, 2002 (SE) ............................................ 0201971

(51) Int. Cl.$^7$ ................................................ B60R 9/04

(52) U.S. Cl. ..................... 224/329; 224/322; 224/331

(58) Field of Search ................................. 224/320, 321, 224/322, 329, 330, 331, 558, 560, 561

(56) References Cited

U.S. PATENT DOCUMENTS

| | | | |
|---|---|---|---|
| 3,920,167 A | * 11/1975 | Parsons | 224/320 |
| 4,496,089 A | * 1/1985 | Eklund | 224/322 |
| 4,993,615 A | * 2/1991 | Arvidsson | 224/329 |
| 5,452,831 A | * 9/1995 | Linnhoff | 224/329 |
| 5,641,107 A | * 6/1997 | Mann | 224/331 |
| 5,730,343 A | * 3/1998 | Settelmayer | 224/321 |
| 6,102,265 A | * 8/2000 | Stapleton | 224/331 |
| 6,419,134 B1 | * 7/2002 | Grimm et al. | 224/331 |

FOREIGN PATENT DOCUMENTS

DE                 3709335 A1 * 10/1988 .................. 224/329

* cited by examiner

Primary Examiner—Gary E. Elkins
(74) Attorney, Agent, or Firm—Orum & Roth (57) ABSTRACT

The present invention relates to a device in a load carrier for vehicles, which load carrier is intended for roof-mounting. The load carrier comprises support members intended to rest against the upper face of the vehicle roof close to the edge thereof, a sheet-metal gripping member disposed in the support member to grip the edge portion of the vehicle roof, and a means arranged to lock the support member and the gripping member in a position, in which said means grippingly engages the associated roof edge portion. The gripping member is divided, in a portion of articulation, into at least two parts as seen in the lengthwise extension of the member, said two parts being hingedly interconnected in said portion of articulation in overlapping fashion while being separated by means of a spacer element. Said spacer element is arranged to prevent, in the mounted position of said gripping member, mutual pivotal movements of said gripping member parts about an axis extending essentially in the plane of the vehicle roof in parallel with the direction of travel of the vehicle. The extension of said spacer element in the crosswise direction of said gripping member is short in order to allow relative tilting movements of said gripping member parts while maintaining the spacing between said overlapping gripping member parts that is required to allow said relative tilting movements. A pivot pin is located on a line common to said spacer element and to the lengthwise extension of said gripping member and at right angles to the plane of said gripping member parts.

20 Claims, 7 Drawing Sheets

DEVICE AT A ROOF-MOUNTED LOAD CARRIER FOR VEHICLES

TECHNICAL FIELD OF INVENTION

The present invention relates to a device in load carrier for vehicles, said load carrier intended for roof-mounting and comprising support members intended to rest against the upper face of the vehicle roof close to the edge thereof, a sheet-metal gripping member disposed in the support member to grip the edge portion of the vehicle roof, and a means arranged to lock the support member and the gripping member in a position, in which said means grippingly engages the associated roof edge portion.

TECHNICAL BACKGROUND OF THE INVENTION

Traditionally, a load carrier of the kind outlined above has been of a rather simple construction. It has been possible to attach it to the vehicle drop edge or to grooves formed in the vehicle roof or around the top piece of the door frame to be automatically fastened to the vehicle as the door is being shut. Previously, load carriers could be transferred to and be used together with vehicles of different models, thanks to the similarity of construction of the vehicles. A load carrier of this kind is described in Patent Specification SE 512 302.

In contrast hereto, the trend today is to design to an increasing extent load carriers with features that are specific to the individual car manufacturer and sometimes even to each individual vehicle model. The reason is primarily that the design of a vehicle today constitutes a highly important factor of success and in consequence thereof, every vehicle model is designed more and more with features that are unique to that vehicle. This affects also the design of the load carriers. Therefore, a change of car might also necessitate a change of load carrier. When the load carrier is of the kind outlined in the introduction, the geometry of the support member must be adapted to fit the shape of the roof edge and the profile of the top piece of the door frame of the associated vehicle. The load-carrier manufacturers have to co-operate closely with the car manufacturers in order to be able to supply the correct type of support members with their associated grip members for all new car models that appear on the market. It may be necessary not only that the support members to be mounted on the right and the left side of the vehicle be different but also the support members of the front and the rear load carrier, because of the curvature of the vehicle roof or the design of other details in the area of the points of attachment of the support members to the vehicle.

Considering the frequent changes of models, this becomes expensive in the long run and the present invention has for its object to provide a device in a load carrier which is intended to be mounted on the roof of a vehicle and which may be mounted on vehicles of a large variety of different types essentially irrespective of the design of the vehicle. In addition, it is an object of the invention to eliminate the need to distinguish between the right and the left side of the vehicle and between the front and the rear load carrier, respectively.

SUMMARY OF THE INVENTION

The object of the present invention therefore is to remove the above-mentioned problems.

This object is achieved by imparting to a device of the kind outlined in the introduction the characteristic features defined in claim 1. Preferred embodiments of the device appear from the claims dependent on claim 1.

The present invention concerns a device in a load carrier for vehicles, said load carrier intended for roof-mounting and comprising support members intended to rest against the upper face of the vehicle roof close to the edge thereof, a sheet-metal gripping member disposed in the support member to grip the edge portion of the vehicle roof, and a means arranged to lock the support member and the gripping member in a position, in which said means grippingly engages the associated roof edge portion, said gripping member divided, in a portion of articulation, into at least two parts as seen in the lengthwise extension of the member, said two gripping-member parts being hingedly interconnected in said portion of articulation in overlapping fashion while being separated by means of a spacer element, said spacer element arranged to prevent, in the mounted position of said gripping member, mutual pivotal movements of said gripping member parts about an axis extending essentially in the plane of the vehicle roof in parallel with the direction of travel of the vehicle, the extension of said spacer element in the crosswise direction of said gripping member being short in order to allow relative tilting movements of said gripping member parts while maintaining the spacing between said overlapping gripping member parts that is required to allow said relative tilting movements, a pivot pin being located on a line common to said spacer element and to the lengthwise extension of said gripping member and at right angles to the plane of said gripping member parts.

These characterising features impart to the device the advantage of allowing the support member to be used in a large number of different vehicle models without the associated gripping member having to be exchanged for one that is adapted to the specific vehicle. The articulated gripping member is able to adapt the position of its gripping member part that grippingly engages the roof edge portion, as a result on the one hand of the freedom imparted to it to pivot about the pivot pin and on the other of the freedom imparted to it to tilt about an axis extending along the common line between the pivot pin and the spacer element. Making use of these two degrees of freedom in combination in accordance with the invention produces the result of allowing the position of the conventionally flat gripping member to be adapted to allow said member to grip the roof-edge parts the extension of which deviates from the extension of the vehicle roof. The first one of said two degrees of freedom could without difficulty be given to a flat two-part gripping member made from sheet metal. Normally, however, a complex articulation joint is required to allow relative tilting movements of the gripping-member parts, a feature which in accordance with the present invention instead is obtained by the provision of a spacer element around which the gripping-member parts may tilt relative to one another. The spacer element should be positioned to the side of the pivot pin that ensures that the spacing between the gripping-member parts arises in the mounting position of the gripping member, i.e. that a lever is formed by the gripping-member part that grippingly engages the roof-edge portion between the face of abutment of said part against the pivot pin and its face of abutment against the spacer element.

In the inventive device, the pivot pin could be a rivet. Rivets have the advantage that they do not gradually disengage with wear and therefore do not lose their interconnecting ability.

Preferably, at least one of the heads of the pivot pin is formed with a domed face that is turned towards the gripping member owing to this feature, the pivot pin is able to more readily allow the tilting movement of one gripping-member part relative to the other one when during said movement the domed face slides along the sheet-metal of the gripping-member part.

Preferably also, the spacer element forms at least two protrusions abutting against one of the gripping-member parts. In this manner, two abutment faces are formed preventing the pivotal motion about said axis. The provision of two abutment faces likewise has the advantage of maintaining the spacing between the two gripping-member parts, irrespective of in which direction the gripping-member parts try to pivot relative to one another, an arrangement which facilitates a simultaneous occurrence of the tilting movement.

It is an advantage if the spacer element is formed integrally with one of the gripping-member parts. This means that this component is less expensive to manufacture, since fewer parts are required, and that assembly is facilitated.

It is likewise an advantage if the spacer means forms a ridge, which abuts against one of the gripping-member parts. For example, the spacer element could be a sheet-metal fold formed in either one of the gripping-member parts. This is a simple and therefore inexpensive manner of forming an articulated joint to effect the relative tilting movement of the two gripping-member parts.

The pivot pin advantageously is positioned centrally through the spacer element. This arrangement ensures a symmetric and therefore stable connection.

BRIEF DESCRIPTION OF THE DRAWINGS

The invention will be described in the following in more detail with reference to the accompanying drawings which for exemplifying purposes show presently preferred embodiments of the present invention. In the drawings.

DETAILED DESCRIPTION OF PREFERRED EMBODIMENTS

Figure 3:
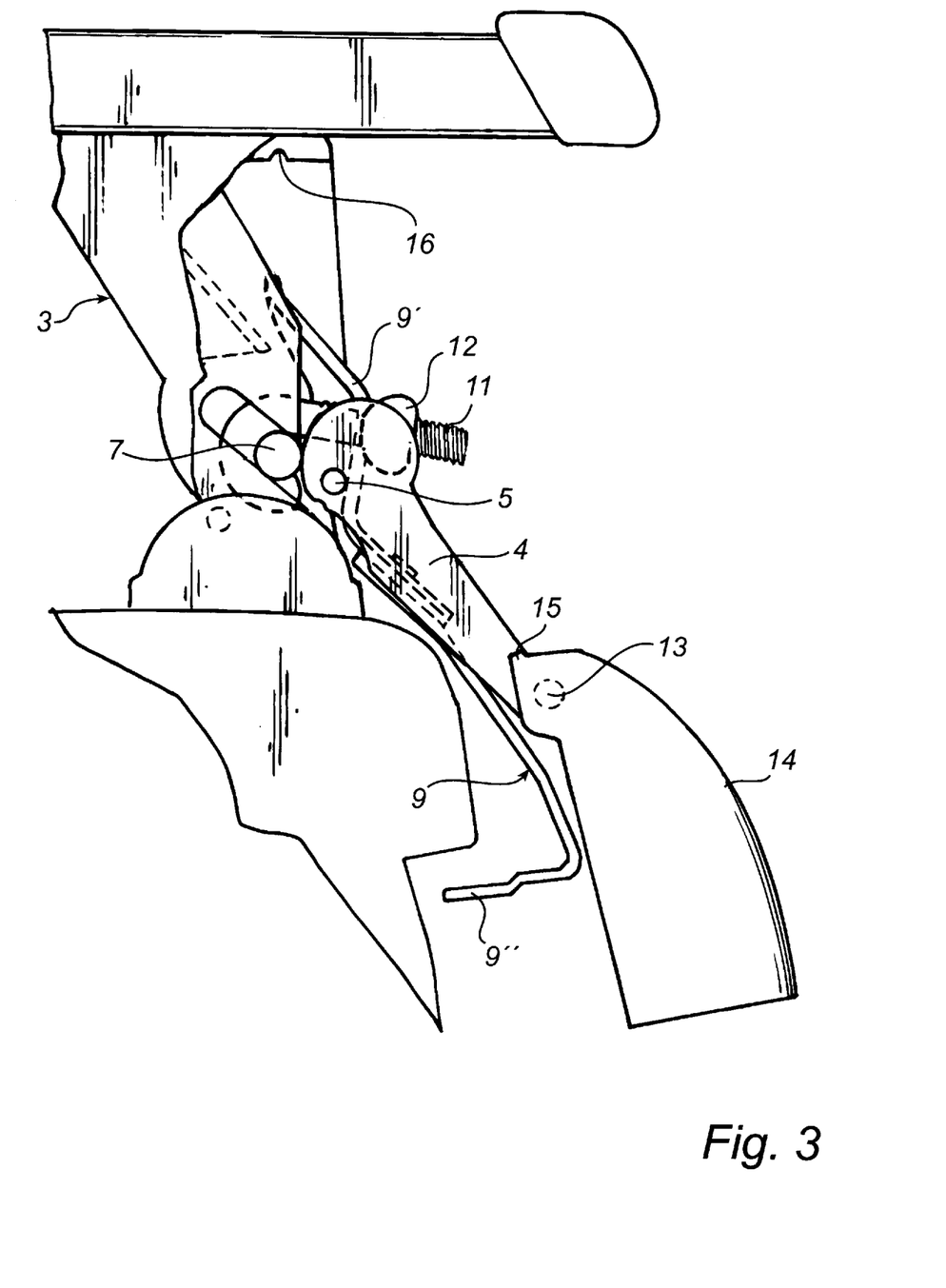
FIG. 3 is a schematic cross-sectional view of the load carrier and the vehicle, the section being taken in the area of one of the support members of the load carrier and showing the load carrier in its not yet secured position.
Figure 4:
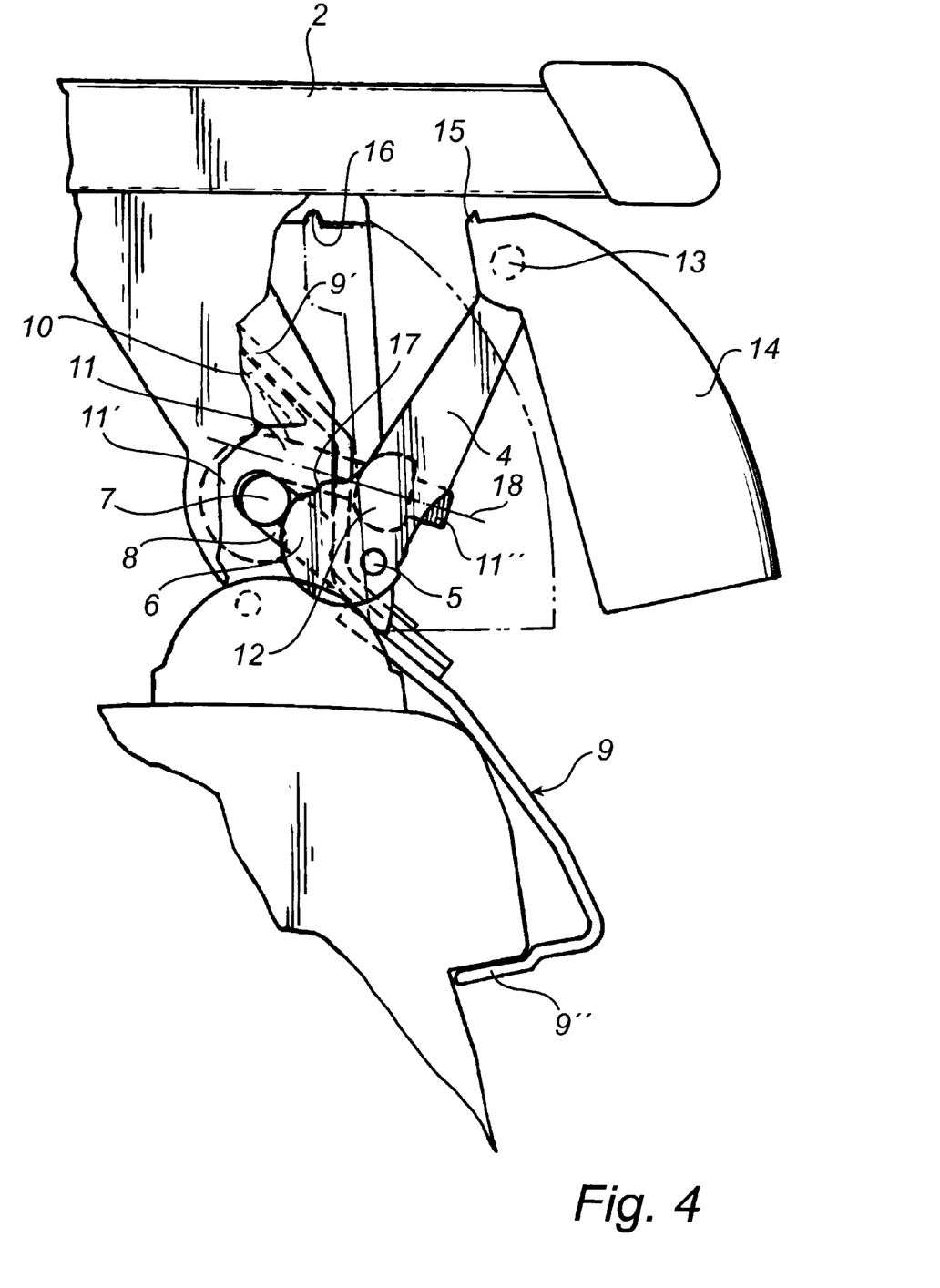
FIG. 4 is a corresponding cross-sectional view of the load carrier, the section being taken in the area of one of the load-carrier support members and showing a partially and a completely secured position of the load carrier.
Figure 5:
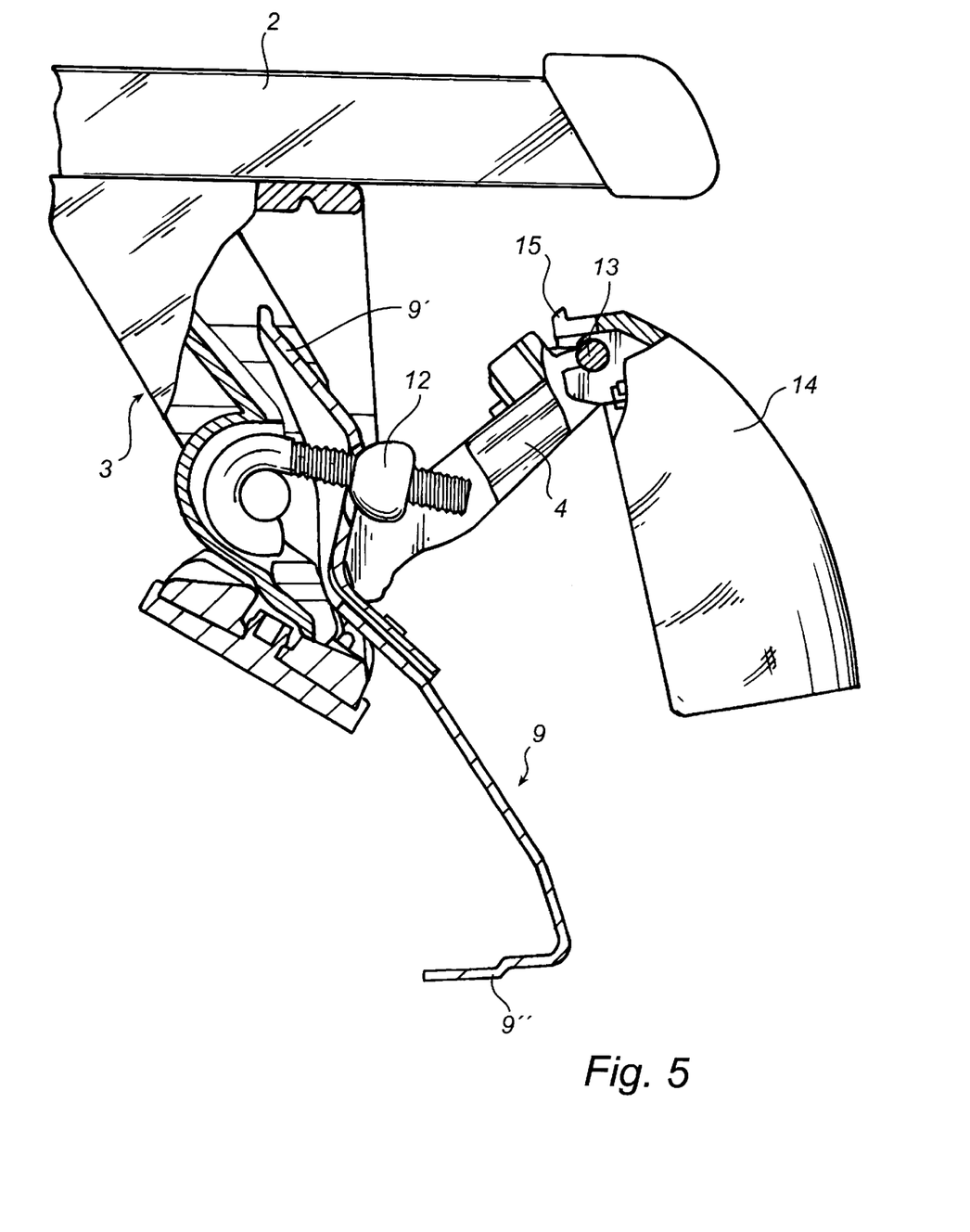
FIG. 5 is a cross-sectional view of the same load carrier in the area of one of the load-carrier support members, the sectional being taken centrally through the support member and its associated components.

Initially, the function of the load carrier as a whole and its associated means will be described. The load carrier shown in the drawings consists of a load-carrying rail 2, said rail extending transversely of the vehicle across the roof 1 thereof. In the vicinity of the outer sides edges of the roof, said rail rests on the upper face of the vehicle roof by means of support members 3, only one of which is shown herein for the sake of simplicity. The support member 3 could be attached to the load-carrying rail in any suitable manner, for example by means of a screw joint or tension joint. Since the fastening means could be of any kind known per se and it is not crucial to the invention, it will not be described herein in detail. Preferably, the support member 3 is provided at its lower part with an abutment part 3', which preferably is fitted with a soft sole and which is turnably connected to the other portion 3" of the support member turnable and consequently able to adapt its position to the transverse inclination of the roof at the point of abutment. Numeral reference 4 designates a lever, which is mounted for vertical pivotal movement in a fulcrum 5, which suitably may be formed by a horizontal pivot pin extending through the lever 4 and the support member 3. In accordance with the shown embodiment the lever is composed of two lever members arranged in an essentially parallel relationship, as most clearly apparent from FIG. 1. At its end closest to the fulcrum 5, each lever member is formed with a cam-like eccentric portion 6. Numeral reference 7 designates a yoke member, which extends essentially in parallel with the pivot pin 5 and which is mounted in a guide means 8 so as to be displaceable in its transverse direction. In accordance with the shown embodiment, said guide means consists of two guide slots that are spaced apart as seen in the longitudinal direction of the yoke member 7. As partly apparent from FIG. 1, the support member 3 could be U-shaped, as seen in horizontal cross-section, have its open and turned towards the vehicle. The laterally open end turned towards the vehicle. The laterally open casing thus formed by the support member houses the associated actuators that are operative to tighten a clamping member 9 against the underside of the roof-edge part, this clamping the support member to the upper face of the roof edge. In the shown embodiment the gripping member 9 is a sheet-metal component, the lower part of which is bent into a hook-like shape, which extends into the interior of the support member past the yoke member and, by means of a support portion 9' above said yoke member, rests in sliding abutment against a support face 10 in the interior of the support member. The hook-shaped end portion of the gripping member is designated in the drawings by 9". Numeral reference 11 designates a set bolt. One 11' end portion of the set bolt extends in a hook-shaped manner round the yoke member 7 and the opposite end 11" thereof, which is threaded, extends through an opening formed in the gripping member 9. A support nut 12 is screwed onto the threaded end portion and is used to set the distance between the gripping member 9 and the yoke member 7. To the end of the lever that is the upper one in FIG. 4, a handle 14 is pivotally mounted by means of a pivot 13, and the handle may be pivoted together with the lever between the position shown in FIG. 3 and the position indicated in dash-and-dot lines in FIG. 4. Above the pivot 13 the handle is provided with a locking lug 15, and in its upper part the support member is formed with a matching locking recess 16, into which the locking lug may be inserted by means of pivotal movement upwards of the lever 4, the handle being in an outwardly pivoted position, and thereafter pivotal movement downwards of the lever to the position indicated in FIG. 4 in dash-and-dot lines. In this manner, the lever, 4 together with the handle 14, forms a toggle joint system, which in the position indicated in FIG. 4 in dash-and-dot lines forms a folded knee-joint with the knee positioned uppermost, which knee may be straightened by pivotal movement to the position shown in FIG. 3. The handle 14 is configured so as to form a cover, which in the position shown in the dash-and-dot lines in FIG. 4 covers the outwardly open side of the support member and thus encloses the parts of actuators and associated motion-transferring mechanisms that are disposed inside the support member. Upon pivotal movement of the lever 4 the cam-like eccentric portion 6 of the latter performs, together with the guide means 8, a movement similar to that of shears blades, the yoke member 7 then forming a slide means made to perform a movement in front of the "nip of the shears" as seen from the fulcrum 5 articulating the lever to the support member 3. The position of the yoke member thus is determined by the position of the "nip of the shears", i.e. the pivotal position of the lever relative to the support member 3. The lever 4 could be regarded as a single-arm lever, the cam curves being located on the same side of the fulcrum 5 as the handle and orientated so that the "nip of the shears" is displaced away from the fulcrum when the handle/lever is pivoted inwards towards the support member 3.

By providing two parallel levers 4 with identical eccentric portions 6, two spaced-apart, parallel cam curves are formed. The distance between cam curves belonging to the same part and this being phases-orientated relative to each other is bridged by the yoke member 7, which forms the slide member. The gripping member 9 is suspended from the yoke member 7 by means of the set bolt 11. By adjustment of the distance between the gripping member 9 and the yoke member, made possible by means of the support nut 12, it becomes possible to adjust also the vertical position of the hook-shaped end portion 9″ of the gripping member relative to the engagement part 3′ of the support member. In the shown embodiment, the center lines of the threaded part of the set bolt 11 is positioned above the yoke member when the lever 4 is pivoted upwards, the eccentric portion 6 forces the yoke member 7 to move up the guide means 8 and thus pull along the gripping member 9 in its motion, said motion being controlled by the co-operation between the upper portion 9′ of the gripping member and the guide path 10 formed in the support member. At the upper end of its active part, the eccentric portion 6 is formed with a shoulder 17 the slide-member support edge of which is directed transversely relative to the direction of the pull acting on the slide member. In this manner, a self-locking effect will arise when the lever 4 is pivoted to its upper position, i.e. the gripping position, thus relieving the lever 4 of the forces that try to pivot said lever outwards, also when the yoke member 7 is subjected to a heavy load. In addition, the curvature of the cam curve suitably is adapted to ensure that the leverage ratio between the lever 4 and the gripping member 9 is greater during the last part of the clamping motion than during the other part of the motion.

Figure 1:
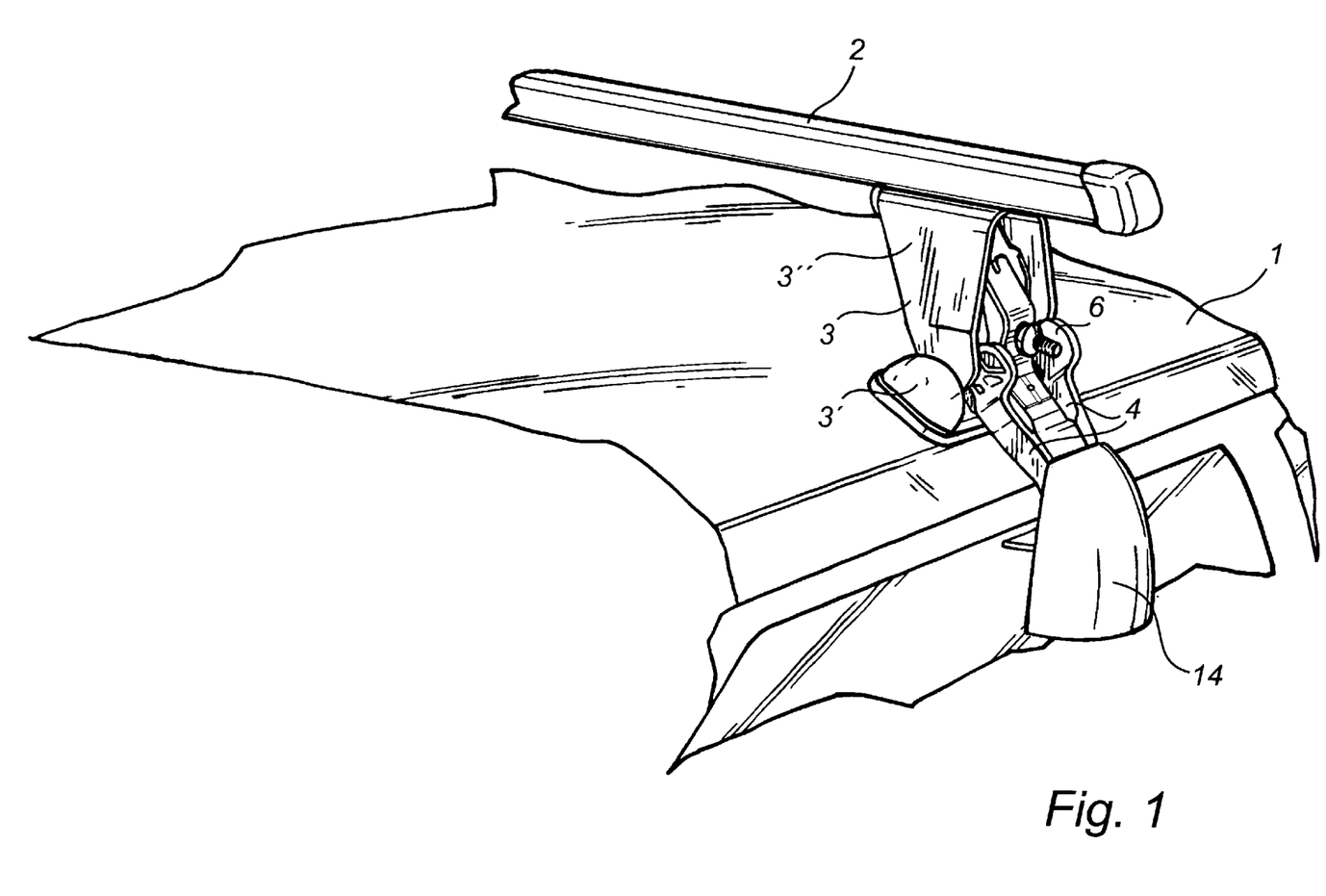
FIG. 1 shows a part of a vehicle having a load carrier positioned thereon.
Figure 2:
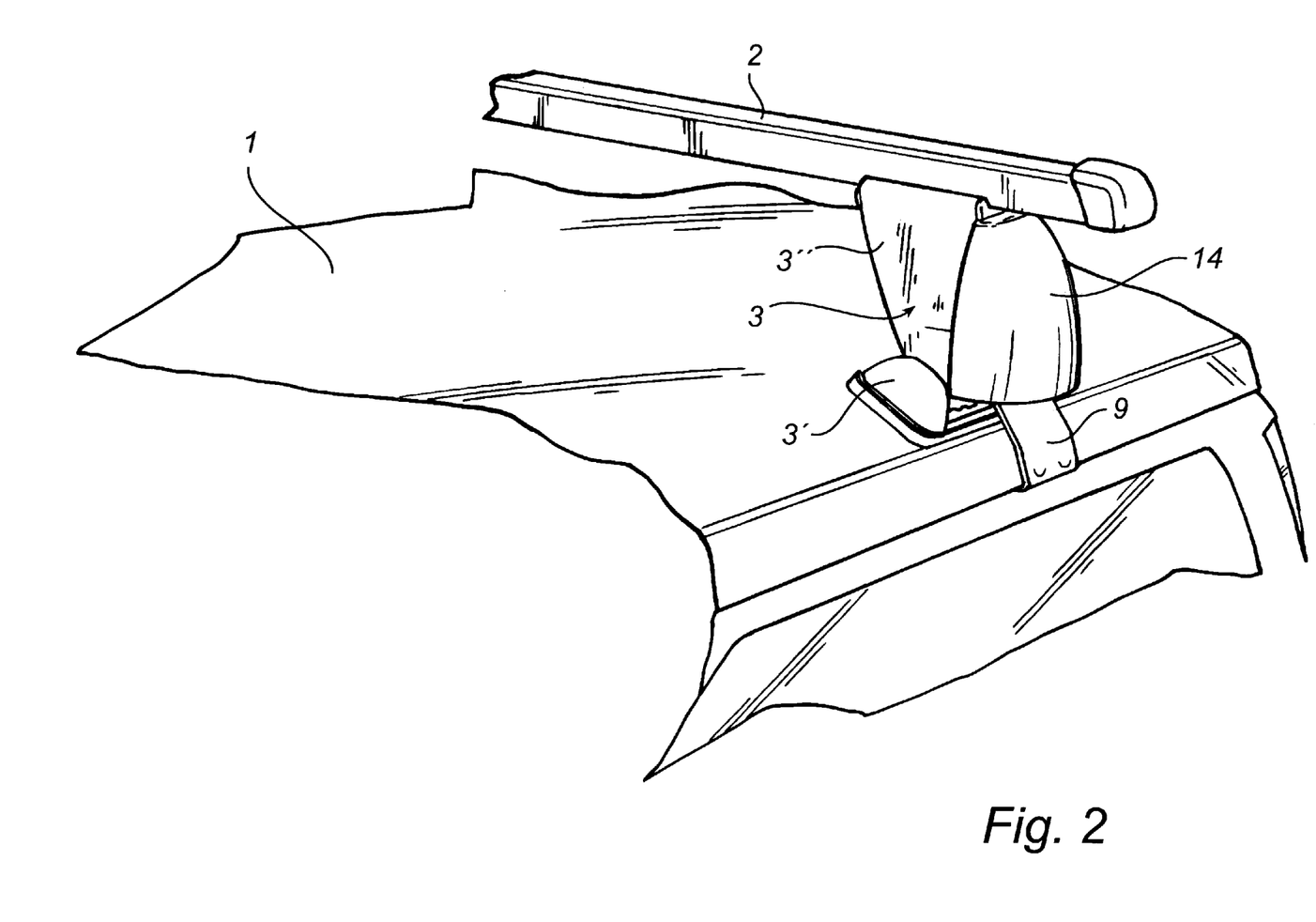
FIG. 2 is a view corresponding to FIG. 1 but showing the load carrier as secured to the vehicle.

The load carrier is suitably fixed to a vehicle by placing it on top of the vehicle roof as shown in FIG. 1, with the gripping member 9 and the handle 14 hanging down over the side of the vehicle. Subsequently, the lever 4 is pivoted upwards by means of the handle 14 being raised, via the position indicated in full lines in FIG. 4 to the position indicated by dash-and-dot lines in FIG. 4, the "clamping position". With the support nut 12 being set in the correct position in advance, it will thus become possible to clamp the support member against the vehicle roof with considerable force and thus to efficiently secure the load carrier to the vehicle. The articulated connection of the handle to the lever 4 in the toggle joint 13 allows the lever to perform a very long pivoting motion independently of the thickness of the handle 14. This makes for a high force leverage ratio between the lever 4 and the gripping member 9. Consequently, a highly stable tightening force is obtained without it being necessary to apply too heavy a coercive force on the handle in order to secure the load carrier. The force leverage ratio could also be selected in such a manner that the pivotal movement of the lever brings about a comparatively large movement of the gripping member 9 as compared to that of previously known devices. Owing to the considerable pivotal movement of the lever 4, it becomes possible to obtain such adaptation of the gripping-member movements and of force leverage ratios as are suitable for the intended purpose and required by the actual need. Thanks to the thus provided freedom of design of the lower part of the handle 24 the latter may be made sufficiently voluminous to allow it to be gripped firmly by the person who intends to release the load carrier from the vehicle, in that it provides him with ample space in which to insert his fingers, allowing him to easily pull the lever outwards to the position of release. In a manner known per se also the handle/protective cover 14 and the lever 4 may be formed with mutually compatible details of a key-operated lock to prevent an unauthorised person from releasing the load carrier.

Figure 6:
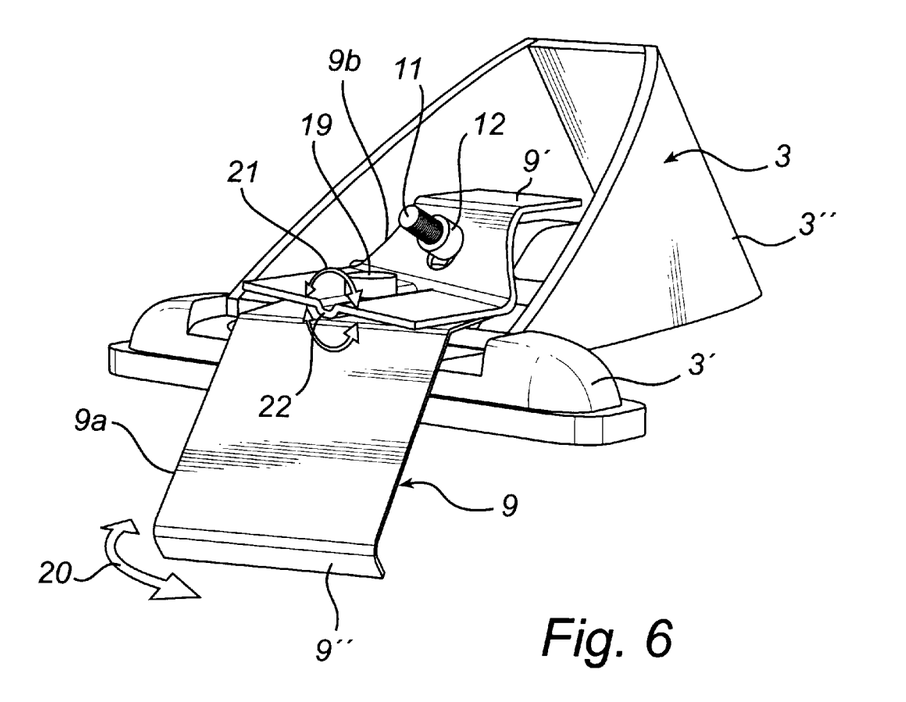
FIG. 6 is a perspective view of parts of a support member.

The gripping member in accordance with the present invention will be described in the following in more detail with reference to FIGS. 6–9. FIG. 6 shows the support member 3 together with the support member abutment part 3′ and other support member part 3″, and also a gripping member 9, which is divided into two gripping-member parts, one part 9a that grippingly engages the roof and one part 9b that is disposed in the support member 3. Part 3″ is shown in the position in which it has been shifted rearwards relative to the normal-use position in order to show grip member 9 more clearly. In the same manner as described previously, the gripping member 9 is mounted in the support member with the aid of a set bolt 11 and a support nut 12. The gripping-member parts 9a and 9b are interconnected by means of a rivet 19 extending through apertures 23 formed one in each gripping-member part (not shown in this drawing figure, see instead FIG. 7), said rivet being tightened only to an extent allowing relative pivotal movement 20 of said gripping-member parts about the rivet. The upper portion 9′ of gripping-member part 9b, which is accommodated in the support member, has the same guiding/control function as the previously described prior-art gripping member. When the gripping member 9 is in its mounted position, i.e. prior to being locked in the position in which it secures the load-carrying rail 2 to the vehicle 1, gripping-member part 9a rides on top of a spacer element, which in this case consists of a fold 22 formed in the sheet-metal of gripping-member part 9b, thus preventing motion about an axis extending in the plane of the vehicle roof in the direction of travel of the vehicle 1. Gripping-member part 9a abuts only against the sheet-metal fold 22 and against no other part of gripping-member part 9b. The rivet 19 ensures that no relative sliding motion of parts 9a and 9b occurs. Because the rivet 19 is placed centrally in the sheet-metal fold 22 and because a spacing is formed between parts 9a and 9b, gripping-member part 9a is allowed to perform a tilting movement about the axis 21 formed by said just-mentioned sheet-metal fold.

Figure 7:
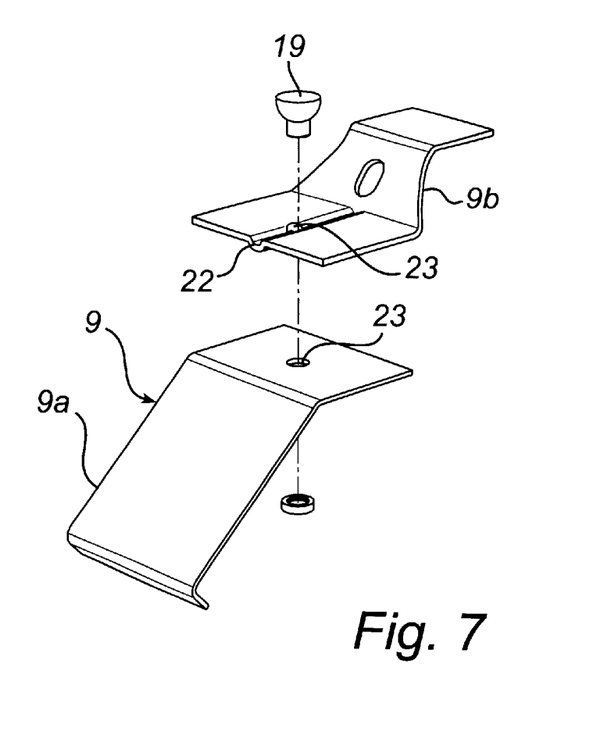
FIG. 7 is an exploded view of the gripping member in accordance with the present invention.

FIG. 7 is an exploded view of the gripping member 9 only. In accordance with the preferred embodiment, gripping-member part 9b disposed in the support member 3 is arranged above, as seen in the vertical direction, the roof-edge engaging gripping-member part 9a and the sheet-metal fold 22 is formed in gripping-member part 9b. The function of the gripping member 9 remains the same, however, should the above arrangement be reversed. The rivet 19 is arranged to extend through apertures 23 formed in gripping-member parts 9a and 9b, respectively.

Figure 8:
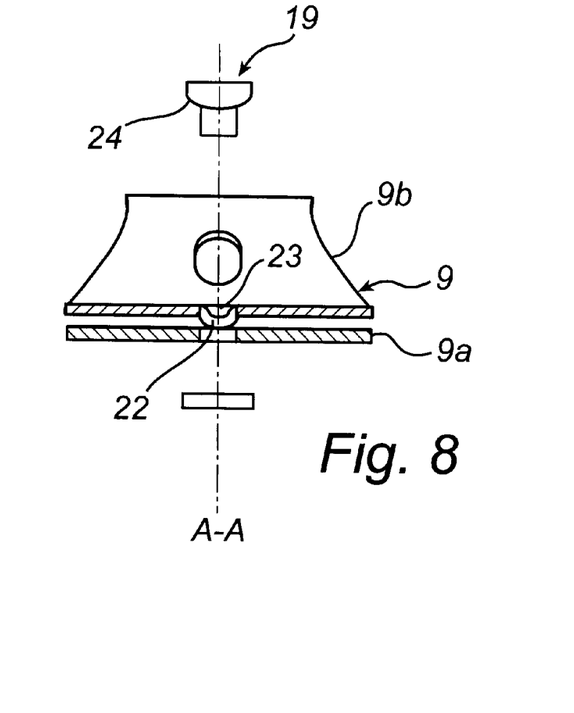
FIG. 8 is a sectional view of the gripping member in accordance with the present invention.

FIG. 8 is a cross-sectional view of the gripping member, as seen in the longitudinal direction of the member, level with apertures 23 and the rivet 19. In order not to prevent the tilting movement 22 of gripping-member parts 9a and 9b relative to one another, the face 24 turned towards gripping-member part 9b has been given a somewhat arched shape.

Figure 9:
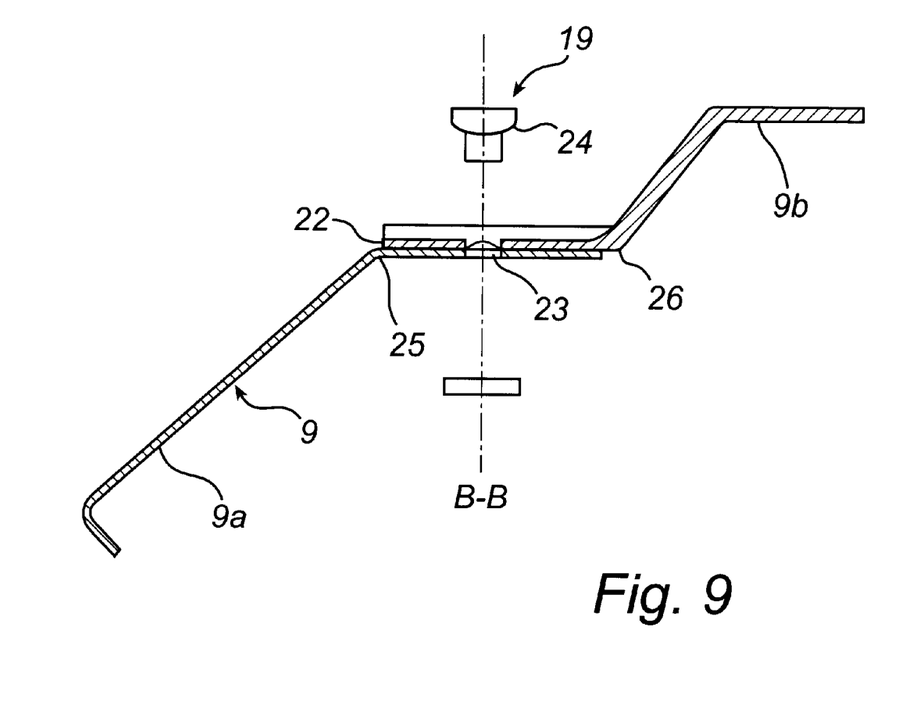
FIG. 9 is a sectional view of the gripping member in accordance with the present invention.

FIG. 9 is a cross-sectional view of the gripping member as seen in the transverse direction of said member, level with the apertures 23 and the rivet 19. Also this drawing figures shows the domed configuration of the face 24 of the rivet 19 that is turned towards the gripping-member part 9b. The position of the bending lines 25 and 26 formed in the sheet-metal components of gripping member 9 may be adapted to ensure that in its mounted position the gripping member 9 does not touch the vehicle 1 and in doing so damage it.

As should be appreciated a large number of modifications of the embodiment described above are possible within the scope of protection of the invention as the latter is defined in the appended claims. For example, the gripping member 9 with its two gripping-member parts could be made from other components than sheet-metal pieces, such as from one or several bent rods formed with a flat area in the portion of articulation.

What is claimed is:

1. A device in a load carrier for vehicles, said load carrier intended for roof-mounting and comprising support members intended to rest against the upper face of the vehicle roof close to the edge thereof, a sheet-metal gripping member disposed in the support member to grip the edge portion of the vehicle roof, and a means arranged to lock the support member and the gripping member in a position, in which said means grippingly engages the associated roof edge portion, wherein said gripping member is divided, in a portion of articulation, into at least two parts as seen in the lengthwise extension of said member, said gripping-member parts being hingedly interconnected in said potion of articulation in overlapping fashion while separated by means of a spacer element, said spacer element arranged to prevent, in the mounted position of said gripping member, mutual pivotal movements of said gripping member parts about an axis extending essentially in the plane of the vehicle roof in parallel with the direction of travel of the vehicle, the extension of said spacer element in the crosswise direction of said gripping member being short in order to allow relative tilting movements of said gripping member parts while maintaining the spacing between said overlapping gripping members parts that is required to allow said relative tilting movements, and in that a pivot pin is located on a line common to said spacer element and to the lengthwise extension of said gripping member and at right angles to the plane of said gripping member parts.

2. A device as claimed in claim 1, wherein said pivot pin is a rivet.

3. A device as claimed in claim 2, wherein at least one of the heads of the pivot spin is formed with a domed face that is turned towards the gripping member.

4. A device as claimed in claim 3, wherein said pivot pin is positioned centrally though said spacer element.

5. A device as claimed in the claim 2, wherein the pivot pin is positioned centrally through said spacer element.

6. A device as claimed in claim 1, wherein at least one of the heads of the pivot pin is formed with a domed face that is turned towards the gripping member.

7. A device as claimed in claim 6, wherein said pivot pin is positioned centrally through said spacer element.

8. A device as claimed in claim 1, wherein said spacer element forms at least two protrusions abutting against one of the gripping-member parts.

9. A device as claimed in claim 8, wherein said spacer element is a sheet-metal fold formed in either one of the gripping-member parts.

10. A device as claimed in claim 8, wherein said spacer element forms a ridge, said ridge abutting against one of said gripping-member parts.

11. A device as claimed in claim 8, wherein said spacer element is formed intergally with one of the gripping-member parts.

12. A device as claimed in claim 11, wherein said spacer element forms a ridge, said ridge abutting against one of said gripping-member parts.

13. A device as claimed in claim 12, wherein said spacer element is a sheet-metal formed in either one of the gripping-member parts.

14. A device as claimed in claim 13, wherein said pivot pin is a rivet; at least one of the heads of the pivot pin is formed with a dome face that is turned towards the gripping member; and said pivot pin is positioned centrally through said spacer element.

15. A device as claimed in claim 1, wherein said spacer element is formed integrally with one of the gripping-member parts.

16. A device as claimed in claim 15, wherein said spacer element forms a ridge, said ridge abutting against one of said gripping-member parts.

17. A device as claimed in claim 15, wherein said spacer element is a sheet-metal fold formed in either one of the gripping-member parts.

18. A device as claimed in claim 1, wherein said spacer element forms a ridge, said ridge abutting against one of said gripping-member parts.

19. A device as claimed in claim 1, wherein said spacer element is a sheet-metal fold formed in either one of the gripping-member parts.

20. A device as claimed in claim 1, wherein said pivot pin is positioned centrally through said spacer element.

* * * * *